Sept. 16, 1958  F. M. JOHNSON  2,852,299
WING TANK RACK EXPLOSIVE BOLT ASSEMBLY
Filed April 19, 1956  3 Sheets-Sheet 1

INVENTOR.
FRANCIS M. JOHNSON
ATTORNEYS

Sept. 16, 1958     F. M. JOHNSON     2,852,299
WING TANK RACK EXPLOSIVE BOLT ASSEMBLY
Filed April 19, 1956     3 Sheets-Sheet 2
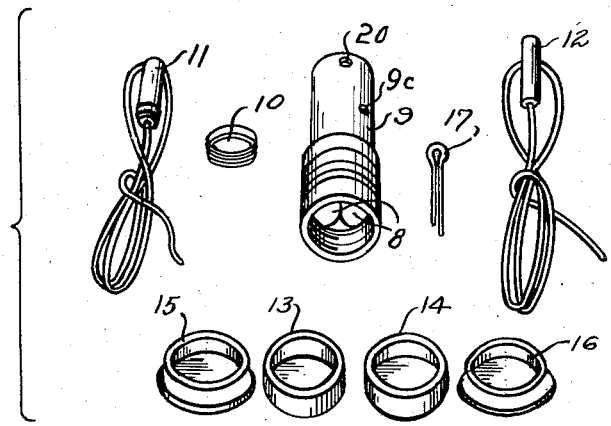
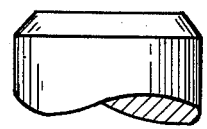
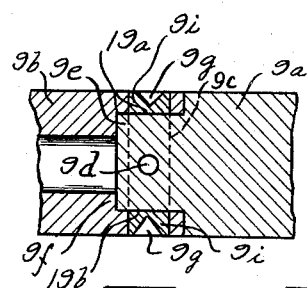
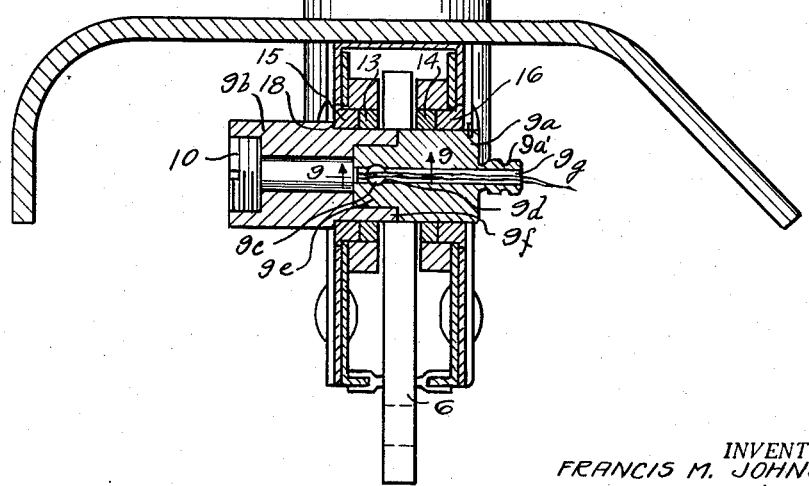
INVENTOR.
FRANCIS M. JOHNSON
BY
ATTORNEYS

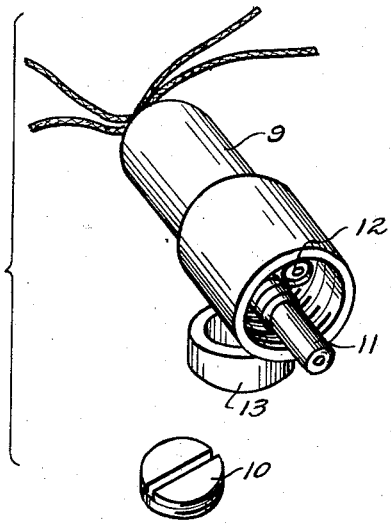
_Fig_5_
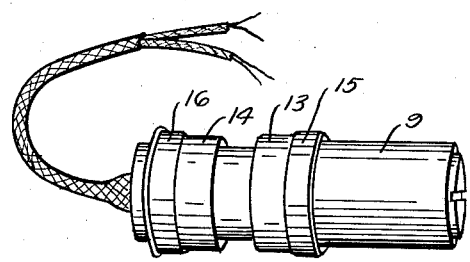
_Fig_6_
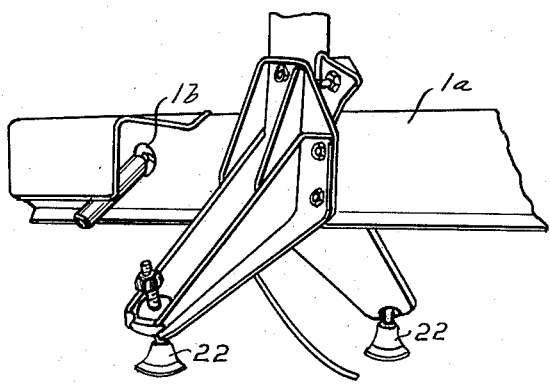
_Fig_7_
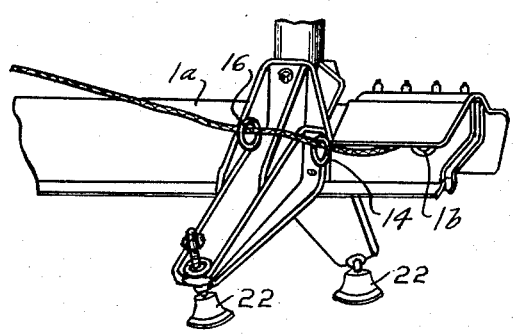
_Fig_8_
INVENTOR.
FRANCIS M. JOHNSON
ATTORNEYS

United States Patent Office 2,852,299
Patented Sept. 16, 1958

2,852,299

WING TANK RACK EXPLOSIVE BOLT ASSEMBLY

Francis M. Johnson, Dayton, Ohio, assignor to the United States of America as represented by the Secretary of the Air Force Application April 19, 1956, Serial No. 579,420

7 Claims. (Cl. 294—83)

(Granted under Title 35, U. S. Code (1952), sec. 266)

The invention described herein may be manufactured and used by or for the United States Government for governmental purposes without payment to me of any royalty thereon.

This invention relates to a new type wing fuel tank rack designed and engineered to furnish a unit simple in design, foolproof in operation, and one that requires a minimum of maintenance and assures, at all times, the greatest flight safety. More particularly, the invention resides in an explosive bolt assembly for mounting or supporting an auxiliary fuel tank to the underside of an aircraft wing.

In recent years, the range requirements of modern high speed aircraft has greatly increased the necessity for auxiliary fuel tanks mounted beneath the wing of the aircraft. This great need led to the development of a variety of release mechanisms for dropping such auxiliary wing tanks when no longer required or when in contact with enemy aircraft.

It is also of extreme importance that the pilot has a dependable control of the auxiliary fuel tank mounted beneath the wing of his aircraft so that on exhaustion of fuel therein and/or on approach of enemy aircraft a rapid and effective release thereof may be effected without the danger of "hang-up" of the fuel tank caused by an incomplete separation.

An object of the invention, therefore, is the provision of a release mechanism that is easy to control and dependable in operation.

Another object of the invention is the provision of a wing rack incorporating a plurality of explosive bolt assemblies from which the wing tank is suspended.

A further object of the invention is the utilization of an explosive bolt assembly providing a rapid release of the auxiliary wing tank.

A still further object of the invention resides in an explosive bolt assembly unique in operation and relatively simple to assemble and mount in the wing rack.

An additional object of the invention is an explosive bolt assembly constructed and assembled so as to completely eliminate or, at least, drastically reduce the number of "hang-ups" occasioned by the tank failing to completely separate on explosion of the bolt assembly.

Another object of the invention is the provision of a new and improved explosive bolt assembly wherein clearance holes are provided to assure complete separation on actuation of the release mechanism. More particularly, loose fitting bushings are utilized to mount the explosive bolt assembly in the bolt-mounting holes. In addition, the bushings are made of a comparatively soft material to insure easy and dependable separation on explosion of the bolt.

A still further object of the invention resides in the provision of an explosive bolt assembly which releasably supports not only auxiliary wing tanks but also, bombs, stores, airborne lifeboats, "parasite" aircraft, missiles, and other jettisonable loads and components, said assembly being positioned either beneath the aircraft wing or from some other part of the aircraft.

For the sake of simplicity, the following description of the invention is taken in connection with and makes reference only to an aircraft wing tank, wing tank rack, or the like; however, it is to be understood that this represents but one example of the many uses to which the explosive bolt assembly of the invention may be made, and that any of the jettisonable loads and/or components stated above may be substituted for the wing tank, wing rack or the like without departing from the spirit of the invention.

Other objects and advantages of the invention will become apparent from the following description, taken in connection with the accompanying drawings, in which like reference characters refer to like parts in the several figures.

Fig. 3 is a layout of the assembled bolt assembly including plug, squibs, spacers, bushings and cotter pin.

Fig. 4 is a cross-sectional end view of the wing rack with the explosive bolt assembly shown in detail.

Fig. 5 is a view of the bolt assembly with the explosive squibs mounted therein.

Fig. 6 is a partial schematic view of the completely assembled bolt assembly with the two sets of spacers and bushings mounted thereon.

Fig. 7 illustrates the first step of mounting the explosive bolt assembly in the wing rack with the bushing and spacer elements omitted.

Fig. 8 illustrates the second step of mounting the explosive bolt assembly in the wing rack.

Fig. 9 is a cross-sectional view of the shear pin utilized in the explosive bolt assembly taken on line 9—9 of Fig. 4.

Figure 1:
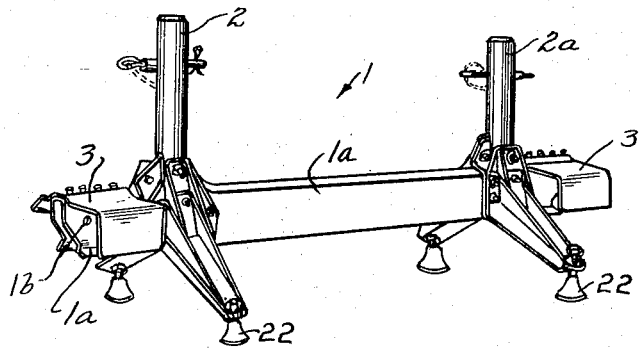
Fig. 1 is a view of the wing tank rack prior to mounting beneath an aircraft wing.

The explosive bolt assembly shown in detail in Fig. 3 includes the bolt 9, the plug 10, explosive squibs 11 and 12, spacers 13 and 14, bushings 15 and 16 and the cotter pin 17. To assemble the complete bolt assembly preparatory to mounting the same in place in the wing tank rack 1, the explosive squibs 11 and 12 are first inserted into openings 8 provided in the bolt 9 as shown in Fig. 5, the plug 10 is positioned in place in one end of the bolt 9 as seen in Fig. 4, and then the squib leads are arranged so that the ground leads are separated from the hot leads. Next, these separated leads are sealed by a suitable sealing compound to the nipple end 9a' of the bolt and then are run through separate lengths of insulating spaghetti with both lengths of the latter protected by radio shielding. Said shielding is grounded and safetied with one turn of soft copper wire and then the open ends of said leads are adaptable for soldering to the proper sockets of an electrical connector in an appropriate wiring system (not shown) under switch control of the aircraft pilot which electrical connector is likewise adaptable for insertion in an appropriate fitting (not shown) in an aircraft wing shown schematically at 21 in Fig. 2 of the drawings. The radio shielding is, likewise, safetied and grounded to said electrical connector. At this point, the explosive bolt assembly is completely assembled and ready for mounting in the wing tank rack 1.

Figure 2:
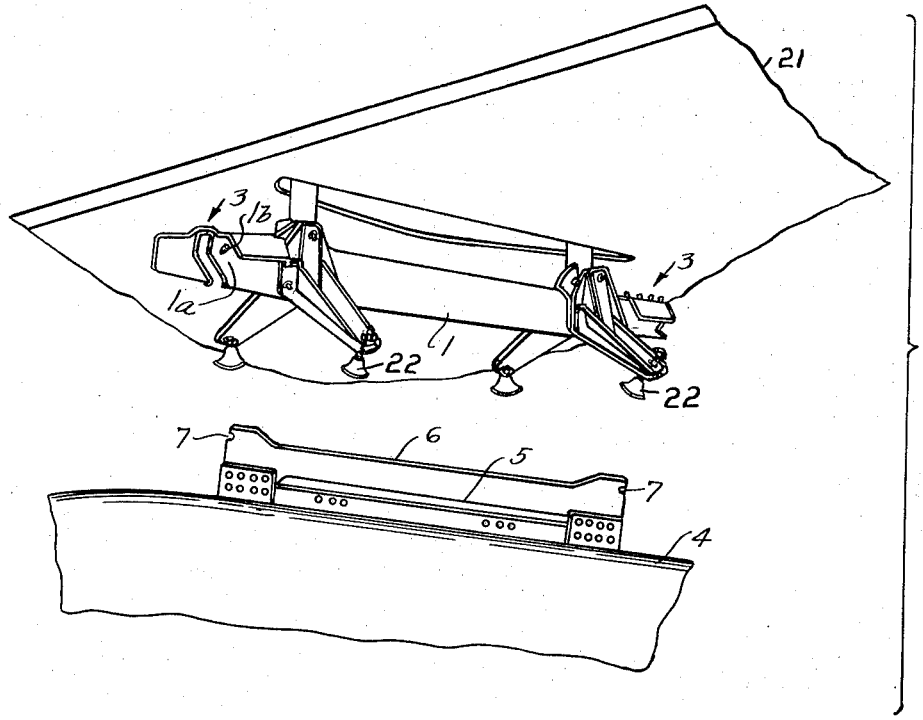
Fig. 2 illustrates the wing tank rack of Fig. 1 mounted beneath an aircraft wing with the auxiliary tank ready for assembly thereto.

With particular reference to Fig. 1, it is seen that the wing tank rack 1 includes a sway brace assembly having four (4) sway brace lugs 22, a pair of deflector plates 3, and two mounting posts 2 and 2a. Said posts are made in two lengths to fit the mounting brackets in the aircraft wing. The long post 2 must be mounted in the forward (front) bracket. Said wing rack 1 also includes a main support member 1a which is channel-shaped or U-shaped in cross section and has a pair of 1⅛"

diameter holes 1b in the side legs thereof at each end. The deflector plates 3 are mounted on each end of the rack and are formed with a 90 degree bend on the inboard side and a 45 degree bend on the outboard side. The wing tank 4 includes a flange 5 mounted thereon as seen in Fig. 2 to which flange the tank bracket 6 is assembled by means of 8 cap screws and nuts at each end thereof. Said bracket 6 includes a machined half-hole or semi-circular notch 7 at each end thereof for mounting the same on the wing rack 1.

The wing rack 1 and the wing tank 4 are now ready for assembly. Immediately prior to such assembly, the four (4) sway brace lugs 22 are backed off. Next, one bushing 15 or 16 and one spacer 13 or 14, are mounted on the explosive bolt assembly 9 and the latter is inserted from the inboard side into the 1⅛" diameter hole 1b at either end of the rack 1 as illustrated in Fig. 7. The bushing is properly seated in said hole and the bolt is inserted all the way. At this point, it is noted that such installation is always made from the inboard side—that side having the 90 degree bend in the deflector plate. A second bushing and spacer are then placed on the opposite end of the explosive bolt 9, as shown in Fig. 8, and this is properly accomplished by sliding both bushing and spacer down the radio shielding surrounding the open ends of the squib leads. The assembly is then safetied by a cotter pin 17 which is spread in the normal manner after being inserted in a counterbored hole 20 in each bolt assembly. The spacers 13 and 14 are separated as shown in Fig. 6 to allow the mounting flange 5 to fit between them, at which point one end (the left-hand side, for example) of the tank 4 is raised until one of the machined half-holes or semicircular notches 7 in one end of the bracket 6 rides on the bolt. Then, the other end of said tank 4 is lifted until the other machined half-hole or notch 7 (the right-hand side, for example) of said bracket 6 is lined up with the 1⅛" diameter hole in the opposite end of the rack 1. A second explosive bolt assembly together with spacer and bushing elements is installed and safetied as previously outlined. Finally the sway brace lugs 22 are hand tightened and locked in place by tightening the upper and lower nuts engaged therewith.

It is further noted with particular reference to Fig. 4 that each explosive bolt 9 consists of two (2) main parts, 9a and 9b, held together by a shear pin 9c, said pin having a small opening 9d in its center portion to permit passage of the squib leads therethrough, the part 9b being to the left as seen in Fig. 4 and containing the explosive squibs, 11 and 12, only one of which is shown, the latter being retained within the body of said part by a plug or screw cap 10. The essential characteristics of each bolt assembly are that the shear pin 9c retains part 9a in engagement with part 9b under a minimum shear load of 2000 pounds, said shear pin being made of a soft material, as for example, aluminum, to facilitate rapid and dependable separation. Preferably, two 10 gr. explosive squibs 11, 12 are used in each bolt assembly. The latter characteristic provides a force sufficient to separate the two parts of said bolt assembly under an 8000 pound shear load. Thus, on exploding the bolt assembly to effect a quick and reliable release of the particular auxiliary wing tank supported thereby, the soft aluminum shear pin 9c easily splits apart under pressure of the expanding gases to separate the two main parts, 9a and 9b, of said bolt assembly. At this point, it is noted that the bolt part 9b does not have the same diameter throughout its length but instead has a smaller diameter in the area of its connection to second bolt part 9a. As clearly seen in Fig. 4, this difference in diameter forms a shoulder 18 against which the bushing abuts. It is also seen that part 9a is of the same diameter as the smaller diameter of said part 9b and that the former interfits with the latter by means of the male member 9e and the female member 9f. With this arrangement, it is seen in Fig. 9 that the shear pin 9c will shear along two shear planes 180° apart, one shear plane being designated at the point 19a where said pin connects between said male and female members 9e and 9f, and the other shear plane being designated at the point 19b where said pin connects between said male and female members exactly 180° away from said first shear plane. The shear pin 9c is further characterized in that both ends thereof are "dimpled" or drilled as illustrated at 9g in Fig. 9 in order to reduce the amount of material of the shear pin in the area of said shear planes. This is an important additional feature of the present invention since it has been determined that the amount of such material greatly assists in the accomplishment of a complete separation affording a clean shear. It has been determined, also, that too little material is just as disadvantageous (if not more so) as too much material. On the one hand, where a solid shear pin is utilized thereby placing too much material in the area of shear, a considerable amount of said material is seized by the separating bolt parts. On the other hand, if too little material is present in the areas of shear, as when the ends of said shear pin 9c are drilled to such a point that the drilled area 9g is in contact with the plane of shear 19a or 19b and thus the remaining material is insufficient for adequate support, a collapsing action is very apt to occur in said shear pin and, again, a considerable amount of the remaining material is seized during the shearing action. In either event, the considerable amount so seized is sufficient to constitute a substantial wedge that in all probability would cause a "hang-up" or failure to completely release the load supported thereby. However, in the instant device an appropriate drill is utilized, as for example, a ¼' drill and each end of the shear pin 9c is drilled or "dimpled" at 9g until the top of the "dimpled" or drilled area is parallel to the surface of the bolt. This removes a sufficient amount of material to eliminate or, at least substantially reduce the amount of material so seized and thereby assist in the shearing action. In other words, with the shear pin 9c of the subject invention "dimpled" as described above there is still sufficient support to prevent collapsing and at the same time less material is available to be seized and thus wedge the bolt parts. The "dimpled" area 9g in each end of said shear pin 9c provides a space into which the remaining ends 9i thereof may collapse during the application of a shear force to said pin. Thus, a cleaner or sharper shear is effected by the shear pin utilized in the instant invention. Moreover, the larger diameter of part 9b projects outwardly from said bushing 15 and extends in the direction of the inboard side of the deflector plate 3. This "overhang," likewise, facilitates complete separation of the exploding bolt parts.

Furthermore, it has been determined as a result of developing the present invention that the explosive bolt assemblies must have clearance holes in order to effectively separate. To insure the latter accomplishment, the present invention emphasizes the utilization of bushings that are made of a soft material such as soft aluminum and, at the same time, are not press fit but are freely mounted in the bolt mounting hole. Such a characteristic assures that upon actuation of the explosive squibs of the instant device, the two parts (9a and 9b) of each bolt assembly are free to travel and carry the bushings therewith. This allowance of a clearance hole at each bolt-mounting hole obviates any wedging or "hang-up" of the bolt assembly.

In addition, it is noted that the plug or screw cap 10 utilized in the present assembly to hold the explosive squibs in place is reduced in size to facilitate its separation from the body of the bolt immediately after firing the squibs and thus reducing the pressure within said body to cause the latter to leave the wing rack under reduced velocity as a safety precaution. At this point, deflector plates 3 guide the exploding parts of each bolt assembly in a direction away from any part of the aircraft and thereby prevent damage thereto.

Thus, the present invention utilizes a unique release system—one that is simple in design, rapid and dependable in operation, involves no moving parts that can deteriorate and malfunction, and yet is safe to actuate.

I claim:

1. In an explosive bolt fuel tank release for an auxiliary aircraft fuel tank, a support, a wing tank adapted to be suspended from said support comprising a rack having a depending flange, an upstanding hanger from said tank adapted to overlap said depending flange in a substantially vertical plane, aligned openings through opposite ends of said flange and said hanger disposed in a substantially horizontal plane, a bushing loosely disposed in each of said aligned holes and removable axially therefrom, an explosive bolt loosely disposed in said bushing for holding said flange and said hanger in suspended condition, and explosive means in said bolt for shattering and separating said bolt intermediate its ends into two main parts for respective movements outwardly through said opposite openings whereby the outward movement of said exploded bolt parts is free to carry said bushings therewith to provide excessive clearance for removal between said aligned openings and said explosive bolt following the explosion of said bolts.

2. In an explosive bolt fuel tank release for an auxiliary fuel tank, a main support element, means for suspending a wing tank from said element comprising a flange depending from said element, a hanger upstanding from said tank in overlapping relation to said flange, a plurality of horizontally disposed aligned openings positioned in said flange and hanger, a plurality of bushings mounted in loose relationship in said openings and axially removable therethrough, and a plurality of explosive bolt assemblies mounted in said aligned openings and having two main parts separable at an intermediate position therebetween, each of said assemblies having means at an intermediate position to insure complete separation thereof into separate parts, said assemblies being loosely positioned in said bushings in said openings to retain said hanger in suspended condition to said flange, said loose positioning of the bushings and bolt assemblies providing excessive clearance between said openings and said assemblies, the latter together with said means assuring complete separation and providing that said separate parts move outwardly through said openings carrying said bushings therewith on explosion of said bolt assemblies.

3. In an explosive bolt fuel tank release for an auxiliary fuel tank as in claim 2, said means comprising a narrow bolt portion extending from the point of separation therebetween to one end of each of said bolt assemblies to insure separation at that point into two separate bolt parts, one being ejected at one side of said main support element and the other being ejected at the other side thereof on explosion of said assembly, each of said separated parts carrying therewith one of said plurality of bushings loosely mounted thereon.

4. In an explosive bolt fuel tank release for an auxiliary fuel tank, a support, a depending flange attached to said support, a wing tank, means for suspending said wing tank from said support, said means comprising an upstanding hanger mounted on said tank and adapted to vertically overlap said depending flange, said hanger and said flange having a plurality of pairs of aligned mounting holes horizontally positioned therein and of a predetermined diameter, a plurality of bushings mounted in each of said pairs of aligned holes, and an explosive bolt mounted in each pair of said bushings for retaining said flange and said hanger in suspended relation, said explosive bolt having a smaller and a larger diameter, one of said bushings being mounted at the juncture between said larger and said smaller diameters, said bushing being loosely positioned in said hole and said explosive bolt being loosely positioned in said bushing to provide an excess clearance therebetween to assure a complete separation of the exploding bolt, the bushing being carried by the exploding bolt part as the latter is ejected through the bolt-mounting hole.

5. In an explosive bolt fuel tank release as in claim 4, said explosive bolt comprising a first section, a section in engagement therewith, and a shear pin between first and second sections to retain the former in engagement with the latter, said shear pin being bored in each end thereof to reduce excess material therein in the region of shear, said reduction of excess material eliminating the amount of said material normally seized at the plane of shear by the exploding bolt parts, said seizure constituting a means of wedging said bolt parts and thereby preventing the separation of said tank from said tank release.

6. A quick-release mechanism for releasably suspending an auxiliary fuel tank from the underside of an aircraft wing, comprising, a main support rack, a pair of deflector plates affixed thereto in spaced overlapping relation relative to the side of said rack and having a 90° bend and a 45° bend, respectively, on opposite sides thereof, said rack having a pair of aligned bolt-mounting holes incorporated therein underneath said deflector plates, an explosive bolt assembly mounted in each of said pairs of aligned, bolt-mounting holes cross-wise of said rack, a pair of soft metallic bushings freely mounted in each of said bolt-mounting holes in surrounding relation to said bolt-assemblies to provide clearance holes therefor, each of said bolt-assemblies comprising a relatively large part and a relatively small part held together by a soft metallic shear pin under a predetermined shear load at the juncture between said parts, a reduced size screw plug incorporated at one end of each of said bolt assemblies to retain said bolt assemblies in assembled condition under said predetermined shear load, an auxiliary aircraft fuel tank, upstanding means mounted on said fuel tank in engagement with the juncture between said bolt parts, and releasable supporting means affixed in overlapping relation to the upper surface of said main support rack in releasable engagement with the upper surface of said fuel tank and the underside of said aircraft wing.

7. A releasable support for an aircraft auxiliary load comprising a depending main support rack, said rack having a first pair of aligned openings incorporated transversely therein, said rack having a second pair of aligned openings therein parallel to, and spaced from, said first pair of openings, an explosive bolt assembly mounted between each of said pair of aligned openings, said explosive bolt assembly being in two parts held together by a shear pin under a predetermined shear load, one of said parts consisting of a relatively large portion and a relatively reduced portion forming a shoulder portion therebetween, the other of said parts consisting of a reduced portion equal to that of said first-named reduced portion and engaged in overlapping relation with the latter, said first-named part adapted to contain explosive material of predetermined size, said second named part terminating in a further reduced nipple end and having a longitudinal central opening extending inwardly from said nipple end, said shear pin positioned between said overlapping reduced bolt portions and having a transverse opening in communication with said central opening adapted to receive a plurality of electrical leads for attachment to said explosive material, said enlarged bolt part terminating in an open threaded end remote from its overlapping relation to said reduced part, a threaded plug in engagement with the threaded end of each of said bolt assemblies of relatively reduced size facilitating rapid separation from the body of said bolt assemblies to reduce pressure on the explosive bolt parts on activation of said bolt assemblies, and means for suspending an auxiliary load on said main support rack, said means comprising, an auxiliary load, an upstanding flange mounted on said load and a bracket in upstanding relation to said flange and having a pair of opposed cut-out portions in surrounding engagement with said overlapping reduced bolt portions, a pair of spacer elements loosely mounted in surrounding relation to each of said bolt assemblies on opposite sides of said bracket, and a pair of soft metallic bushings mounted in surrounding relation on each of said bolt assemblies with one of said pair of bushings in abutting relation to the shoulder portion of said enlarged bolt portion to assist in complete separation of said bolt parts on explosion of said explosive material by activation of said electrical leads.

References Cited in the file of this patent

UNITED STATES PATENTS

| | | |
|---|---|---|
| 2,071,594 | Trimbach | Feb. 23, 1937 |
| 2,585,870 | Spielman | Feb. 12, 1952 |
| 2,653,504 | Smith | Sept. 29, 1953 |
| 2,736,522 | Wilson | Feb. 28, 1956 |